United States Patent
Herrmann

(10) Patent No.: US 11,218,064 B2
(45) Date of Patent: Jan. 4, 2022

(54) ROTOR AND ROTOR CIRCUIT FOR AN ELECTRIC MOTOR

(71) Applicant: Bayerische Motoren Werke Aktiengesellschaft, Munich (DE)

(72) Inventor: Hubert Herrmann, Haimhausen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 232 days.

(21) Appl. No.: 16/439,056

(22) Filed: Jun. 12, 2019

(65) Prior Publication Data

US 2019/0296623 A1    Sep. 26, 2019

Related U.S. Application Data

(63) Continuation of application No. PCT/EP2017/077397, filed on Oct. 26, 2017.

(30) Foreign Application Priority Data

Dec. 14, 2016   (DE) .................... 10 2016 224 916.9

(51) Int. Cl.
*H02K 19/12* (2006.01)
*H02K 11/40* (2016.01)
(Continued)

(52) U.S. Cl.
CPC ............ *H02K 19/12* (2013.01); *H02K 3/18* (2013.01); *H02K 3/52* (2013.01); *H02K 11/02* (2013.01); *H02K 11/40* (2016.01)

(58) Field of Classification Search
CPC . H02K 3/18; H02K 3/52; H02K 11/02; H02K 11/40; H02K 19/12; H02K 19/22; H02K 19/32
(Continued)

(56) References Cited

U.S. PATENT DOCUMENTS 3,654,503 A   4/1972   Whitney
4,591,766 A * 5/1986   Takaba ................... H02K 29/12
                                                310/216.095
(Continued)

FOREIGN PATENT DOCUMENTS

CN       1739233 A    2/2006
CN     102738995 A   10/2012
(Continued)

OTHER PUBLICATIONS

Chinese-language Office Action issued in Chinese Application No. 201780077412.7 dated Sep. 18, 2020 with English translation (13 pages).
(Continued)

*Primary Examiner* — Tulsidas G Patel
*Assistant Examiner* — Rashad H Johnson
(74) *Attorney, Agent, or Firm* — Crowell & Moring LLP

(57) ABSTRACT

A rotor for an electric motor includes an even number n of pole pairs arranged on a rotor body with rotor windings connected in series between two electrical connections to supply or conduct away current through the rotor windings. The series circuit has a first section including n/2 rotor windings arranged first in the series circuit, and a second section including n/2 rotor windings and arranged upstream of the second electrical connection. During application of a direct-current voltage between the two connections in each of the rotor windings of the first section, the radial component of the direct-current flow in the series circuit extends through the entire respective rotor winding, from an outer side to an inner side of the rotor winding, and in each of the rotor windings of the second section, in reverse, from an outer side to an inner side of the rotor winding.

20 Claims, 8 Drawing Sheets

(51) Int. Cl.
*H02K 3/18* (2006.01)
*H02K 3/52* (2006.01)
*H02K 11/02* (2016.01)

(58) Field of Classification Search
USPC .................. 310/184, 185, 195, 208, 210
See application file for complete search history.

(56) References Cited

U.S. PATENT DOCUMENTS

| | | | |
|---|---|---|---|
| 9,906,107 B2 * | 2/2018 | Yamada | H02K 19/12 |
| 2010/0019711 A1 | 1/2010 | Yen | |
| 2010/0259136 A1 * | 10/2010 | Hiramoto | H02K 19/12 |
| | | | 310/68 D |
| 2012/0223600 A1 * | 9/2012 | Tonogi | H02K 1/148 |
| | | | 310/46 |
| 2012/0256510 A1 | 10/2012 | Yamada et al. | |

FOREIGN PATENT DOCUMENTS

| | | |
|---|---|---|
| CN | 103534913 A | 1/2014 |
| DE | 1 538 411 A1 | 12/1970 |
| DE | 10 2012 205 755 A1 | 10/2013 |
| DE | 10 2012 205 756 A1 | 10/2013 |
| JP | 2013-121286 A | 6/2013 |
| RU | 2 059 994 C1 | 5/1996 |
| WO | WO 2012/137056 A2 | 10/2012 |

OTHER PUBLICATIONS

International Search Report (PCT/ISA/210) issued in PCT Application No. PCT/EP2017/077397 dated Jan. 5, 2018 with English translation (four (4) pages).
German-language Written Opinion (PCT/ISA/237) issued in PCT Application No. PCT/EP2017/077397 dated Jan. 5, 2018 (seven (7) pages).
German-language Search Report issued in counterpart German Application No. 10 2016 224 916.9 dated Sep. 12, 2017 with partial English translation (11 pages).
Dorrell D.,"Are Wound-Rotor Synchronous Motors Suitable for Use in High Efficiency Torque Dense Automotive Drives?", 2012, IEEE Industrial Electronics Society, pp. 4880-4885 (six (6) pages).

* cited by examiner

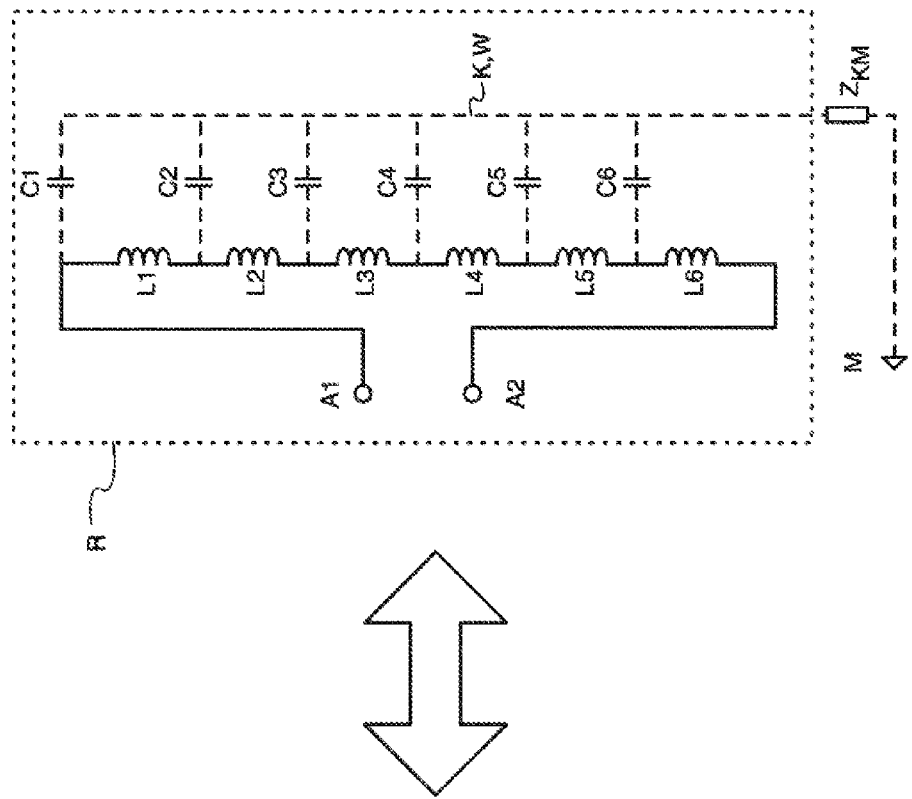
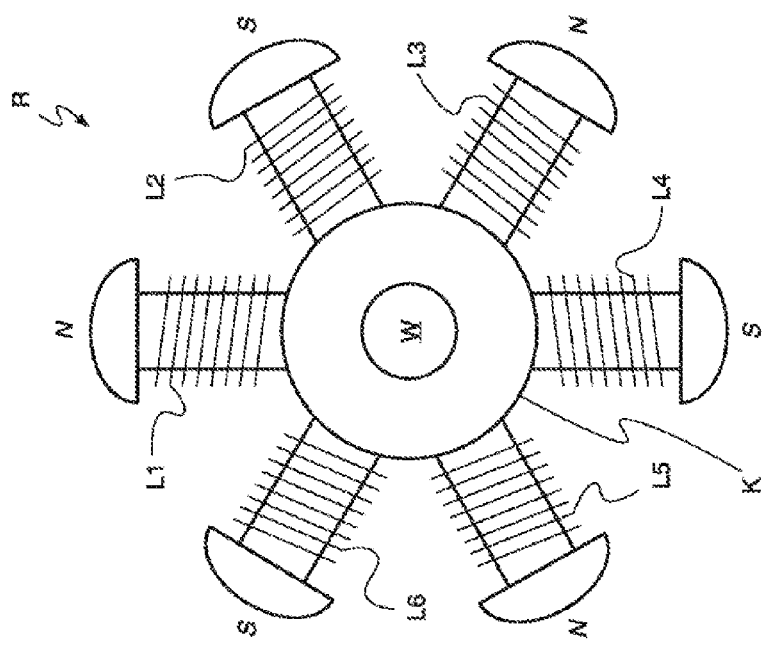
(Prior art)
Fig. 1

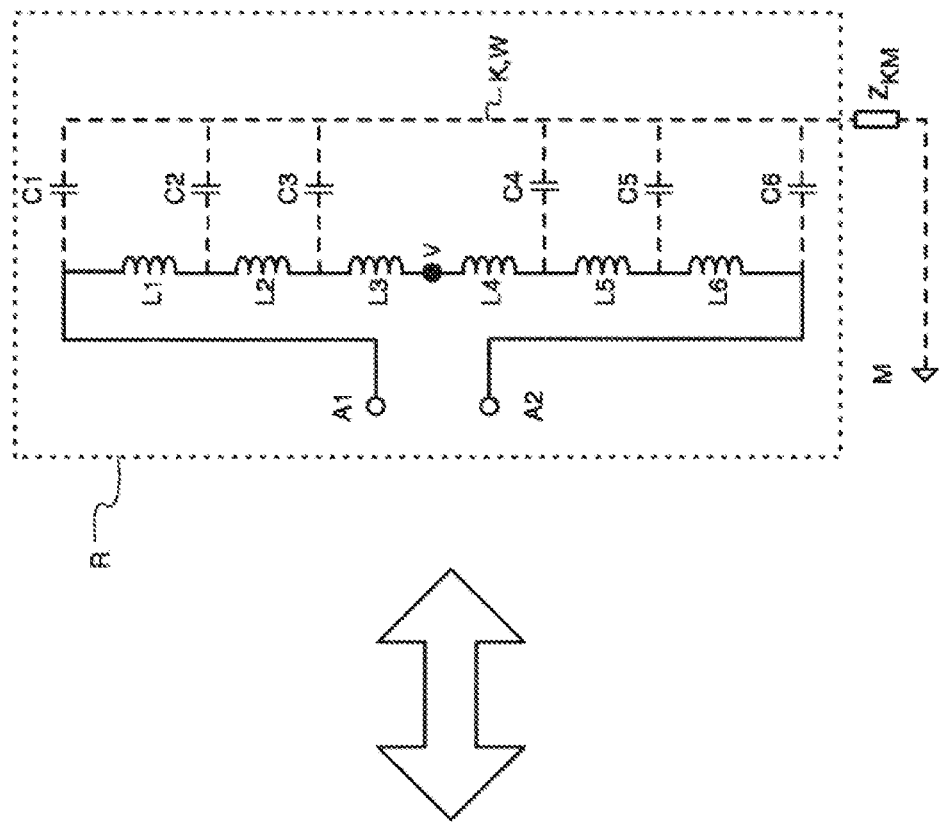
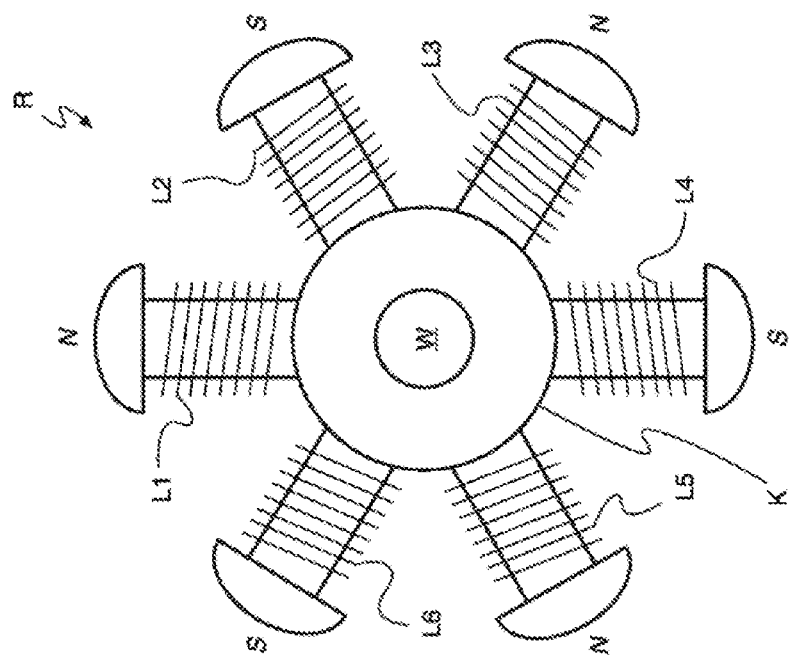
Fig. 3

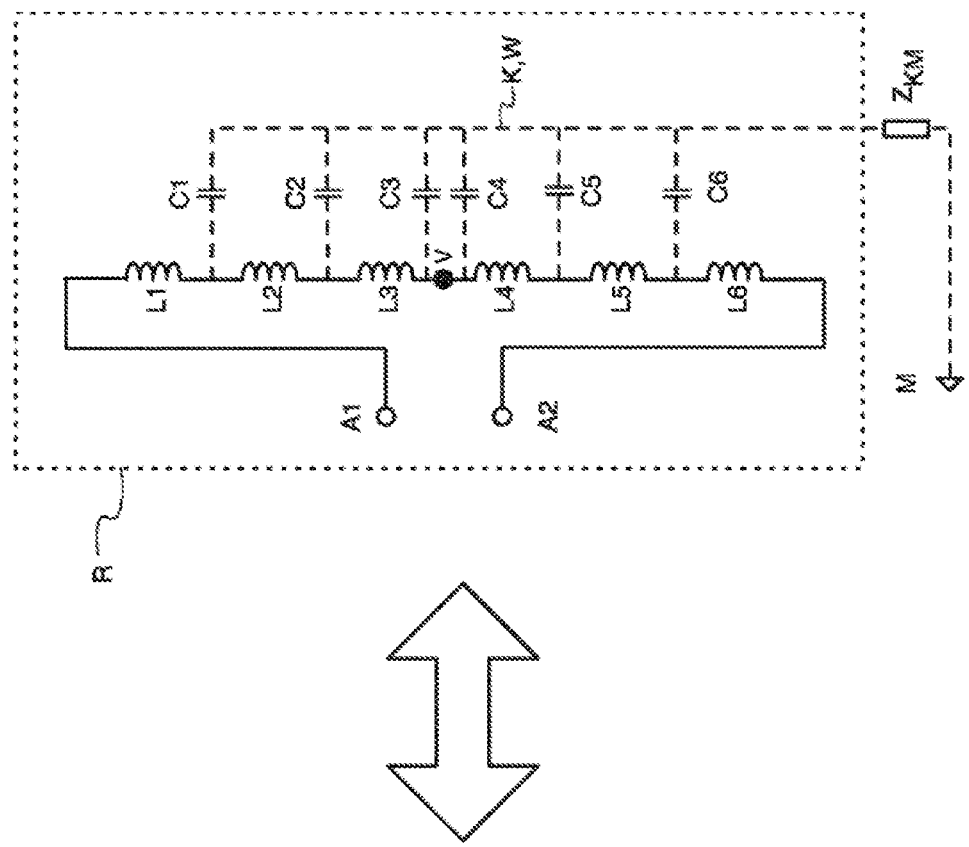
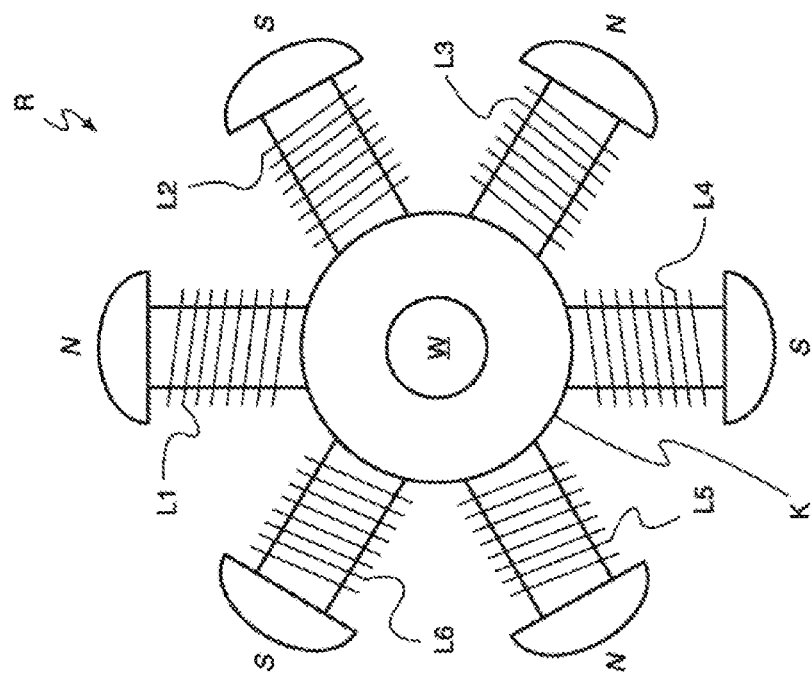
Fig. 5

ROTOR AND ROTOR CIRCUIT FOR AN ELECTRIC MOTOR

CROSS REFERENCE TO RELATED APPLICATIONS

This application is a continuation of PCT International Application No. PCT/EP2017/077397, filed Oct. 26, 2017, which claims priority under 35 U.S.C. § 119 from German Patent Application No. 10 2016 224 916.9, filed Dec. 14, 2016, the entire disclosures of which are herein expressly incorporated by reference.

BACKGROUND AND SUMMARY OF THE INVENTION

The present invention relates to a rotor for an electric motor, in particular a separately excited synchronous motor, a rotor circuit with such a rotor for its control, as well as a separately excited synchronous motor with such a rotor.

In many electrical systems, electric motors are used for a wide variety of tasks. In the case of electrically operated vehicles, in particular motor vehicles such as passenger cars, electric motors are used as traction machines. In the case of electric motors, a wide variety of designs are known, in particular the so-called "synchronous motor." Within the scope of operating an engine, a single-phase and three-phase current synchronous machine is understood, in which a mostly constant rotor in normal operating mode (no overload) is synchronously taken along by a moving magnetic rotary field within the stator.

The rotor can be formed by at least one permanent magnet or electromagnet. In the first case, one speaks of a "self-excited" (synchronous) motor and, in the second case, of a "separately excited" (synchronous) motor, in which the magnetic field of the rotor interacting with the magnetic field of the stator is initially generated by a related electrical current flow through at least one field coil (rotor winding) on the rotor. The energy made available by the magnetic interaction between the stator and the rotor can be tapped via a rotor shaft connected to the rotor via its rotor body or designed as a single piece therewith and, for example, be used for the drive of a motor vehicle or another machine.

In most cases, the rotor body and the rotor shaft are made of an electrically conductive material, in particular of metal. In the case of the separately excited electric motor, this results primarily in stray capacitances being able to occur between the rotor body and the rotor shaft and secondly the at least one rotor winding surrounding it so that parasitic currents can result in the rotor body and the rotor shaft during operation of the electric motor, in particular also in the case of pulse-width-modulated supply voltage in the rotor winding due to capacitive coupling. Such currents result, primarily, in undesired energy losses and can also result in damage to the rotor shaft itself or its bearing. In order to reduce such bearing damages, typically bearing protection devices for grounding the rotor shaft are provided, which "short-circuit" the bearing and are intended to avoid a passage of current through the bearing.

The object of the present invention is to further reduce the associated disadvantages via a capacitive coupling between the rotor winding and the rotor body or rotor shaft.

A solution to this object is achieved in accordance with the teaching of the independent claims by a rotor for an electric motor, a rotor circuit, and a separately excited synchronous motor with such a rotor. Various embodiments and refinements of the invention are also provided.

A first aspect of the invention relates to a rotor for an electric motor, in particular a separately excited synchronous motor. The rotor comprises a rotor body and an even number n of pole pairs arranged on the rotor body with respectively one rotor winding. The rotor windings of the pole pairs are connected in series between two electrical connections of the rotor, which can be particularly slip ring connections, used to supply or conduct away an electrical excitation current through the rotor windings. The rotor winding can, in particular, be designed in such a way that the polarity of the pole pairs following each other consecutively in series alternates. The series circuit here has a first section comprising the n/2 rotor windings, from a first of the connections, arranged first in the series circuit, and a second section comprising the n/2 rotor windings remaining in the series circuit and in addition arranged upstream of the second of the connections. The rotor windings and the series circuit are designed in such a way that during the application of a direct-current voltage between the two connections in each of the rotor windings of the first section, the radial component of the direct-current flow in the series circuit extends through the entire respective rotor winding, from an outer side to an inner side of the rotor winding, and in each of the rotor windings of the second section, vice versa, from an outer side to an inner side of the rotor winding.

In terms of the invention, under the term "pole pair," as is usual in the field of electrical engineering, a pair consisting of a magnetic north pole and the related magnetic south pole are understood. A pole pair can, in particular, as it is here, be generated by an electromagnet, which typically comprises a wound field coil, which is generally wound around a core made of ferromagnetic material (e.g., iron), which serves to guide and strengthen the magnetic field generated by the field coil. In particular, the core can be part of the rotor body.

In terms of the invention, under the term "rotor winding," a field coil of the rotor is understood, which generates such a pole pair when electrical current flows through it, which is provided to interact with a magnetic field generated by a related stator for the purpose of the electromotive drive of the motor.

In terms of the invention, under the term "radial component" of the direct-current flow occurring in the series circuit during operation of the rotor through the respective rotor winding, the directional components of the direct-current flow through the rotor winding is understood, which—independently of the shape of the cross section of the rotor winding, which, in particular, can assume an essentially circular, rectangular, or oval shape, or also another shape—corresponds to the direction of the winding height of the rotor winding. Since the rotor winding is usually designed in layers, in this case, the radial component corresponds in particular to a direction extending perpendicular to the consecutive layers of the rotor winding. The current flow through the respective rotor winding thus extends overall from an outer side to an inner side of the rotor winding (or vice versa), if the net current flow running in the direction of the winding height, which can be determined as the sum or integral of the radial components of the electrical current along the entire rotor winding of a pole pair, extends from an outer side to an inner side of the rotor winding (or vice versa), wherein it is not ruled out that the rotor winding also comprises one or a plurality of individual areas, in which the radial current flow components run in the opposing direction. The windings of the individual rotor windings are preferably screw-shaped or orthocyclic. However, wild windings are also possible.

For the sake of understanding the invention and its advantages, it is helpful to consider the following two physical effects interacting here:

Primarily, in reality, the respective overall electrical resistance Z (also referred to as apparent resistance or impedance) of the individual rotor windings (field coils) of the rotor connected in series consists of a (generally ohmic) effective resistance of the field coil and its inductive reactance. If the series circuit is now applied to a supply voltage, a voltage decrease thereby occurs across each of the rotor windings so that the sum of the voltage decreases corresponds to the supply voltage. As a result, the voltage potential, for example, measured to ground, on the end of the rotor winding directed toward the plus point of the supply voltage is higher than on the end directed toward the minus pole.

Secondly, between the rotor body and, in particular, its rotor shaft and the rotor windings arranged around the rotor body or the rotor shaft, stray capacitances additionally occur regularly, which can result in a capacitive coupling between the rotor windings and the rotor body or the rotor shaft and, therefore, in electrical currents generated due to this coupling in the rotor body or the rotor shaft. This capacitive coupling can thereby be conveyed via related coil cores of the rotor windings which can, in particular, be an integral part of the rotor body. Due to the general distance dependence of the capacitor (in the case of a plate capacitor, it is known that: C~A/d, wherein C is the capacitance, A is the electrode surface and d is the distance of the electrodes (plates)), thereby the components (in particular winding layers) of the rotor that are arranged in the radial direction closer to the center of the rotor winding contribute more to this capacitive coupling than the components lying further toward the outside (in particular, winding layers). In addition, the effect of this coupling is particularly dependent on voltage in such a way that, at higher voltages, higher currents result in the rotor body or in the shaft.

In combination, these two technical effects have the effect that it makes a difference for the capacitive coupling if the electrical current enters into the rotor winding on its inner side and flows from there toward the outside in the radial direction (e.g., layer by layer), or vice versa. In the first case, the strongly capacitively coupling inner part of the rotor winding has a higher electrical voltage potential, which can therefore cause a stronger current flow within the rotor body or the rotor shaft. In the second case, the strongly capacitively coupling inner part of the rotor winding lies on a lower electrical potential due to the overall resistance Z of the rotor winding so that the currents generated due to the coupling are also weaker within the rotor body or the rotor shaft.

With the proposed structure of the rotor, the level of the common mode current can be reduced with relation to an unsymmetrical case since, now, the rotor windings with an opposing polarity, which correspond to each other in pairs in their arrangement in the series (e.g., both rotor windings directly connected to the connections, or the two rotor windings lying around the center point of the series) due to a similarly strong capacitive coupling, cause at least similarly strong stray currents of an opposing direction, which at least partly cancel each other out accordingly. Thereby, the associated disadvantages due to such a capacitive coupling between the rotor winding and the rotor body or rotor shaft can be further reduced. A possible further advantage lies in that an improvement of the electromagnetic compatibility (EMC) can also be achieved in the case of an electric motor constructed using such a rotor.

In the following, preferred embodiments of the rotor, and their refinements, are described that can be combined with each other in any desired way, as well as be combined with the other aspects of the invention that are described further on, provided that this has not been explicitly ruled out.

In accordance with a first preferred embodiment of the rotor, within the scope of the series circuit, the first section and the second section are connected at the connection point in such a way that the two rotor windings, which are directly successively connected via the connection point are each connected to the connection point from a winding section lying on the outer side of their respective winding. In this way, a symmetrical version of the rotor windings, which is related to all the rotor windings, is given, especially in the case of a correspondingly symmetrically constructed rotor body for the reduction of stray currents in the rotor body described above, and can, in particular, be used in the rotor shaft.

As an alternative to this, in accordance with another preferred embodiment, within the scope of the series circuit, the first section and the second section are connected at a connection point in such a way that the two rotor windings, which are directly successively connected via the connection point are each connected to the connection point from a winding section lying on the inner side of their respective winding. Thereby, the advantages also initially result that were already mentioned in connection with the first preferred embodiment. Another advantage includes that, here, the two rotor windings arranged first with relation to the connections of the rotor (in the following: "outermost rotor windings"), on which the highest and the lowest voltage potential and thereby also the highest capacitive coupling in the entire series occurs, each comprise a current flow in the radial direction from the weaker coupling outer side toward the inner side of the rotor windings so that, overall, a weaker capacitive coupling to the rotor body and to the shaft results. Accordingly, although in a weakened form due to the lower voltage potentials, it also applies to the others in the series circuit between the two outermost rotor windings.

In accordance with another preferred embodiment, the rotor windings and the series circuit are designed to be symmetrical in such a way that the electrical stray capacitance of the first section of the rotor body at least essentially corresponds to the electrical stray capacitance of the second section of the rotor body. In accordance with a preferred refinement, the difference between the electrical stray capacitances of the first section and of the second section of the rotor body respectively is no more than 10%, preferably 5%, particularly preferably 2% of the resulting stray capacitance of the overall series circuit of n rotor windings of the rotor body running between the connections of the rotor. Thereby, in the case of this embodiment, it is possible to further reduce the capacitive coupling and the stray currents caused by this within the rotor body and, in particular, the rotor shaft, to at least approximately reduce them to a minimum. In the case of implementing this embodiment, it can be favorable to additionally align the material characteristics (in particular the magnetic ones) as well as the geometrical design of the individual rotor windings, as well as of the rotor body itself in such a way that the desired symmetrization is at least largely achieved.

A second aspect of the invention relates to a rotor circuit for a separately excited synchronous motor. The rotor circuit comprises a rotor in accordance with the first aspect of the invention, preferably in accordance with one or a plurality of its preferred embodiments shown herein. Furthermore, the rotor circuit comprises a first supply line for connecting a first pole of a direct-current supply to the first of the connections of the rotor and a second supply line for connecting a second opposing pole of the direct-current supply to the second of the connections of the rotor. In addition, a capacitive voltage divider connected between the first and the second supply line with a first Y-capacitor between the first supply line and an electrically conductive connection to the rotor body and a second Y-capacitor between this connection and the second supply line is provided.

In this way, the rotor body can be designed to be galvanically decoupled from the supply voltage via the Y-capacitors as well as lacking another direct connection to the supply voltage supplied to the rotor via the two supply lines. Preferably, thereby, in accordance with a refinement, the Y-capacitors for both supply lines are selected to at least be approximately identical in strength. In this way, the potential of the connection line, which can be a floating ground in particular (e.g., vehicle chassis) can be at least approximately set in the middle between the potentials of the two supply lines. In the case of the embodiment of the rotor according to the invention, the reduction of the capacitive coupling associated with this results in a stabilization of this floating ground, which is more robust the more symmetrical the construction of the rotor is designed to be with regard to the capacitive coupling of its individual rotor windings on the rotor body. In particular, this is of significance against the background that, in the case of electric vehicles, typically neither of the two poles of the vehicle battery is galvanically connected to the ground, meaning to the chassis of the vehicle. Thus, a stabilization of the floating ground has a special significance, which can be accomplished as shown by the invention.

In accordance with a preferred embodiment of the rotor circuit, the first supply line comprises a first controllable resistor and the second supply line comprises a second controllable resistor. In addition, a freewheeling diode for the rotor winding is connected between the first and the second controllable resistor and in parallel to the connections of the rotor winding. Preferably, the controllable resistors respectively designed as transistors, preferably as power transistors, such as power MOSFETs or IGBTs, for example. With the aid of these controllable resistors, the magnetization of the motor required for the operation of an electric motor containing the rotor can be controlled and regulated via the current flow through the rotor windings, in particular in order to achieve an adaptation to a load on the engine. Such a control or regulation is preferably carried out by a so-called pulse width modulation (PWM), where a pulse-width-modulated alternating current voltage is impressed on a direct voltage supply of the rotor, supplied via the supply lines, by the controllable resistors. In addition, the duty cycle of a rectangular pulse, meaning the width of the pulses forming it, is modulated, preferably at a constant frequency. The current and, thereby, the torque and thus the power of the motor can be controlled or regulated in this way accordingly by means of varying the pulse widths generated during modulation. In accordance with a preferred refinement, the rotor circuit furthermore comprises a control device for this purpose for controlling the controllable resistors via a PWM-modulated control signal.

A third aspect of the invention relates to a separately excited synchronous motor, in particular a traction motor for an electrically driven vehicle. The synchronous motor comprises a rotor in accordance with the first aspect of the invention, preferably one of its embodiments described herein, as well as an associated stator for generating an electromotive effect during interaction between the stator and the rotor. In particular, in this way, the EMC and the lifetime of the vehicle drive due to the reduction or avoidance of damage of the rotor shaft and its bearing can be improved.

In accordance with a preferred embodiment, the synchronous motor comprises a rotor circuit in accordance with a second aspect of the invention. As has already been shown previously in connection with the description of the rotor circuit, in particular, this makes possible a control or regulation of the motor power as well as the stabilization of the floating ground, which results as the rotor rotates due to the insulation effect of the bearing, in particular between the potentials of the two rotor connections and the potentials of a corresponding supply voltage.

That which has already been previously stated concerning the rotor in accordance with the first aspect of the invention and, in particular, its embodiments and refinements described herein similarly applies to the rotor circuit as well as the synchronous motor, which each comprise such a rotor.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 illustrates a rotor in accordance with the prior art with six rotor windings as an example.

FIG. 3 illustrates a rotor with six rotor windings as an example and its equivalent circuit diagram in accordance with a first preferred embodiment of the invention.

FIG. 5 illustrates a rotor with six rotor windings as an example as well as its equivalent circuit diagram in accordance with a second preferred embodiment of the invention.

DETAILED DESCRIPTION OF THE DRAWINGS

In the following figures, the same reference numbers are consistently used for the same elements of the invention or elements of the invention that correspond to each other.

Figure 2:
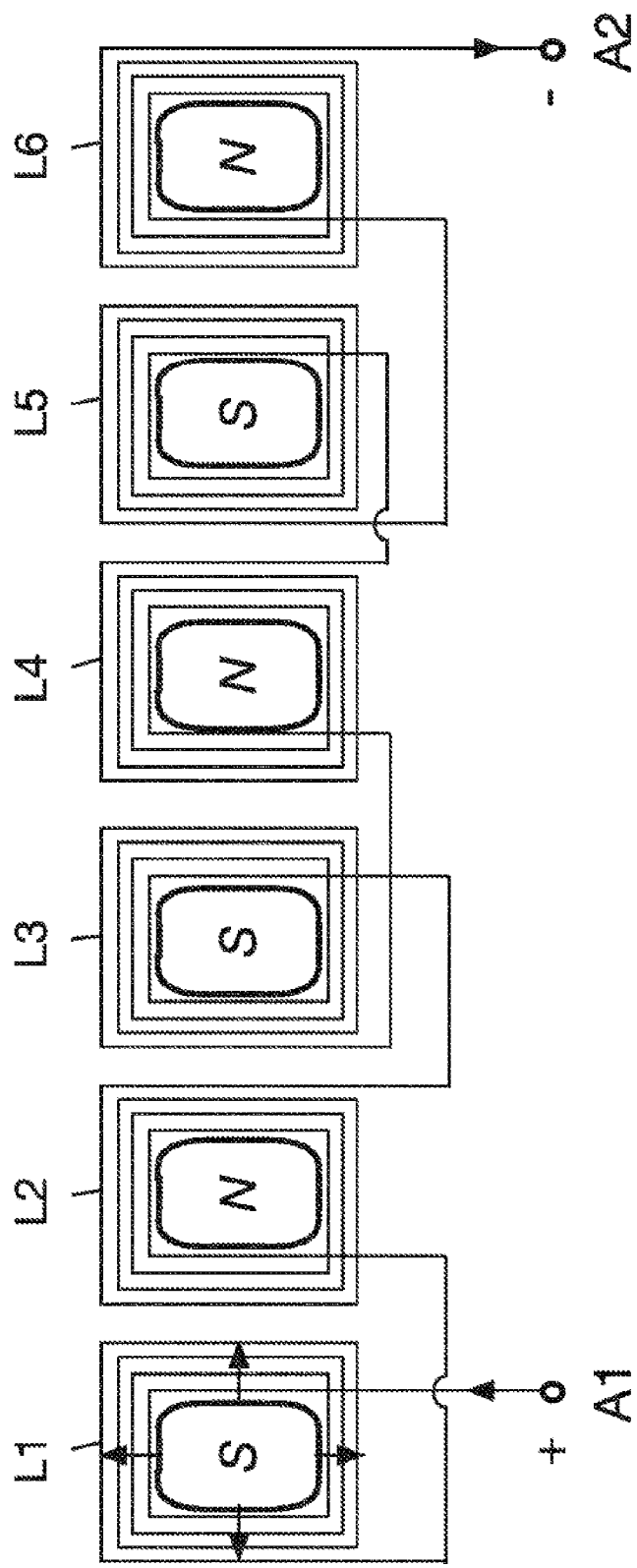
FIG. 2 schematically illustrates a detailed view of the rotor windings of the rotor from FIG. 1 and their series circuit connection.

Initially, in order to explain the prior art, which the present invention is based on, a rotor R in accordance with the prior art is described taking FIGS. 1 and 2 into consideration. On the left side of FIG. 1, such a rotor R is schematically shown, which comprises n=6 pole pairs as an example. The rotor R comprises a rotor body K, which is constructed in a rotationally symmetric matter with relation to a rotor shaft W permanently connected to the rotor body K, and can be rotatably mounted around this by means of the rotor shaft W. The rotor comprises six anchors evenly distributed along the circumference, made of a ferromagnetic material (preferably from parallel ferrous sheets insulated from each other). A rotor winding L1 to L6 is respectively wound around the anchor so that the rotor windings each represent an electromagnet with the respective anchor as a core and each form a magnetic pole pair accordingly. The individual rotor windings L1 to L6 are connected in series. Thereby, with relation to their winding direction, they are designed in such a way that magnetic north poles N and magnetic south poles S are formed in an alternating manner along the circumference of the rotor on its outer side, when the rotor is supplied with a supply voltage.

On the right side of FIG. 1, an equivalent circuit diagram of the rotor R is shown. The actual circuit is represented by continuous lines, and shows the series circuit of the rotor windings L1 to L6 arranged between two connections A1 and A2 of the rotor R. A capacitive coupling, which is shown here in an equivalent circuit diagram using stray capacitances C1 to C6 and using dashed lines, exists between the rotor windings and the rotor body K, in particular also the rotor shaft W conductively connected to it. The rotor body K is connected in an electrically conductive manner to a ground line M via the rotor shaft W and its bearing via an electrical resistor (impedance) $Z_{KM}$ thereby occurring in practice so that currents, which are, for example, coupled by the series circuit of the rotor windings L1 to L6 on the rotor body K or the rotor shaft W in the case of charging of the stray capacitances C1 to C6 or in the case of an alternating current coupling conveyed by them, can flow toward the ground M via the resistor $Z_{KM}$. In particular, the bearings can produce an insulation of the bearing shells when the rotor rotates during operation (the lubricating film typically formed in the bearings insulates a lubricant). Therefore, the bearing is preferably equipped with a so-called shaft grounding ring, which also creates a low-impedance electrical connection from the rotor shaft to the housing while the shaft rotates.

For a more detailed explanation of the stray capacitances C1 to C6 and their position in the equivalent circuit diagram, reference is now additionally made to FIG. 2. There, the series circuit of the individual rotor windings L1 to L6 is schematically shown again in greater detail. If a direct current with the shown polarity (+/−) is applied between the two rotor connections A1 and A2, a current flow through the series circuit results from the connection A1 to the first rotor winding L1 and all subsequent rotor windings L2 to L6 and ultimately to the second connection A2. This is indicated by small arrows. The individual rotor windings L1 to L6 as well as their wiring within the scope of the series circuit are thereby respectively designed such that the current flow, always being on the innermost layer of the rotor winding with relation to the core of the rotor winding, enters into this and exits again on its outer side so that, in the radial direction (indicated in the rotor winding L1 by arrows pointing to its outer side from the inner side of the winding), a net current flow results from the inside out, meaning from the inner side adjoining the rotor body K and the core toward the outer side of the rotor winding. Due to the distance dependency of the stray capacitances C1 to C6 and the increasing distance between the rotation body K and the core and the individual layers of the rotor winding, only the inner layers of the rotor winding essentially contribute to the stray capacitance, wherein, in accordance with the present series circuit, they lie on a higher electrical voltage potential than the layers of the rotor winding lying further outward and downstream with relation to the current direction. This also explains the equivalent circuit diagram on the right side of FIG. 1, where the stray capacitances C1 to C6 each set in on the end of the respective rotor windings L1 to L6, said ends lying upstream with relation to the current direction. As is recognized, the rotor R and its series circuit of rotor windings L1 to L6 are thereby asymmetrically constructed with regard to the position of the associated stray capacitances C1 to C6. Overall, thereby, a significant capacitive coupling between the series circuit of the rotor windings L1 to L6 and the rotor body K and its rotor shaft W results.

Figure 4:
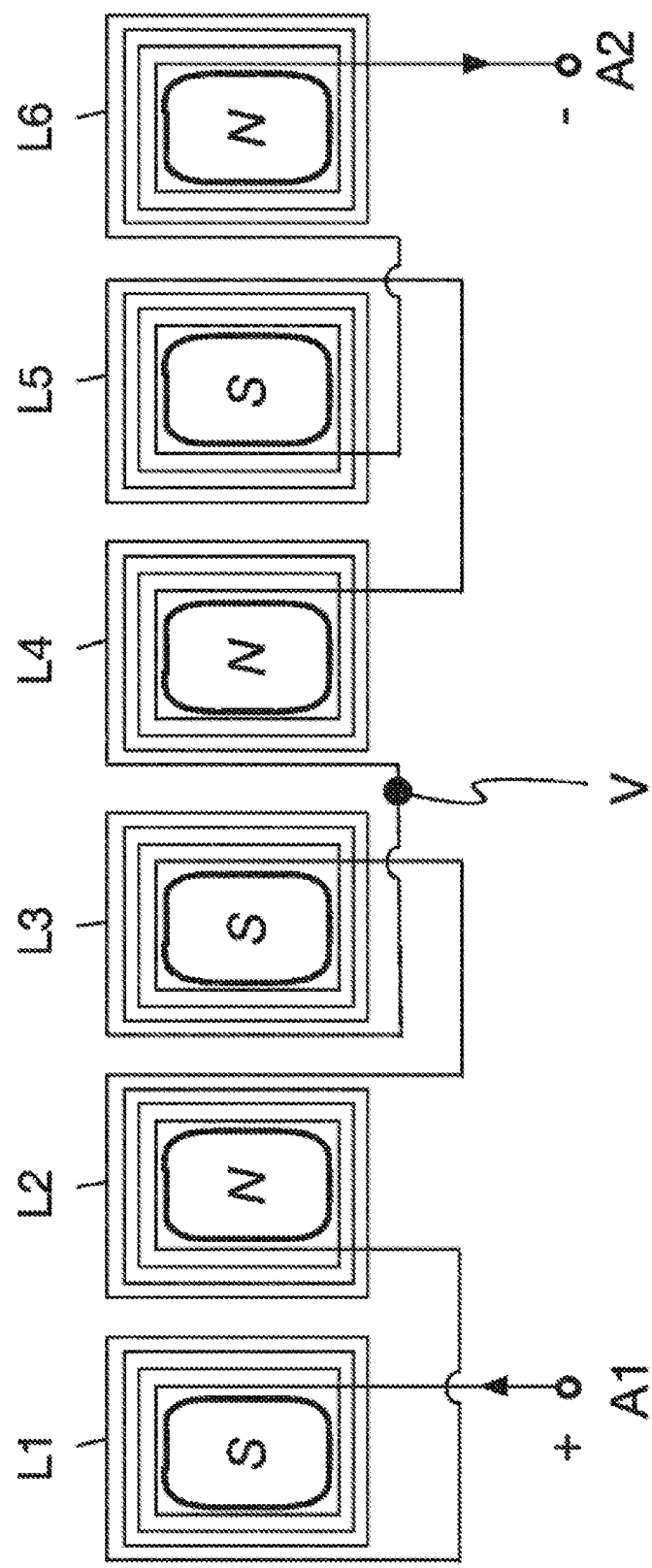
FIG. 4 schematically illustrates a detailed view of the rotor windings of the rotor from FIG. 3 and their series circuit connection.

In FIGS. 3 and 4, in contrast to this, a first preferred embodiment of a rotor R in accordance with the present invention is shown in the same way. The rotor R differs from the one described in FIGS. 1 and 2 in that, like in FIG. 4 and the equivalent circuit diagram corresponding to it, shown on the right side of FIG. 3, the series circuit of the rotor windings L1 to L6 is designed in a different way. Namely, while, in the case of the first n/2=6/2=3 rotor windings L1 to L3 (first section of the series circuit) starting from the first positive connection A1, the electrical current flowing through the series circuit enters into this on the inner side of the rotor winding and thus comprises a net current flow in the radial direction from the inside out; in the case of the second n/2=3 windings L4 to L6 (second section of the series circuit), this is the other way around so that, there, the electrical current enters into the respective rotor winding at the outer side away from the core and exits on the respective inner side near the core. Both sections of the series circuit are connected in an electrically conductive manner to each other at a connection point V within the scope of the series circuit. Consequently, the equivalent circuit diagram shown on the right side of FIG. 3 results, where the stray capacitances C1 to C6 are symmetrically arranged around the connection point V with relation to the two sides or sections of the series circuit, said sides starting from the connections A1 and A2. This symmetry has the effect that when the potential of ground M lies between that of the connections A1 and A2, the stray capacitances in the rotor body K and the rotor shaft W that are conveyed by the stray capacitance, opposing each other in pairs for the pairs C1/C6, C2/C5 and C3/C4 and flowing toward the ground M cancel each other out, at least proportionally. In this way, overall, a reduction and, ideally, even a far-reaching avoidance of undesirable stray currents is made possible.

Figure 6:
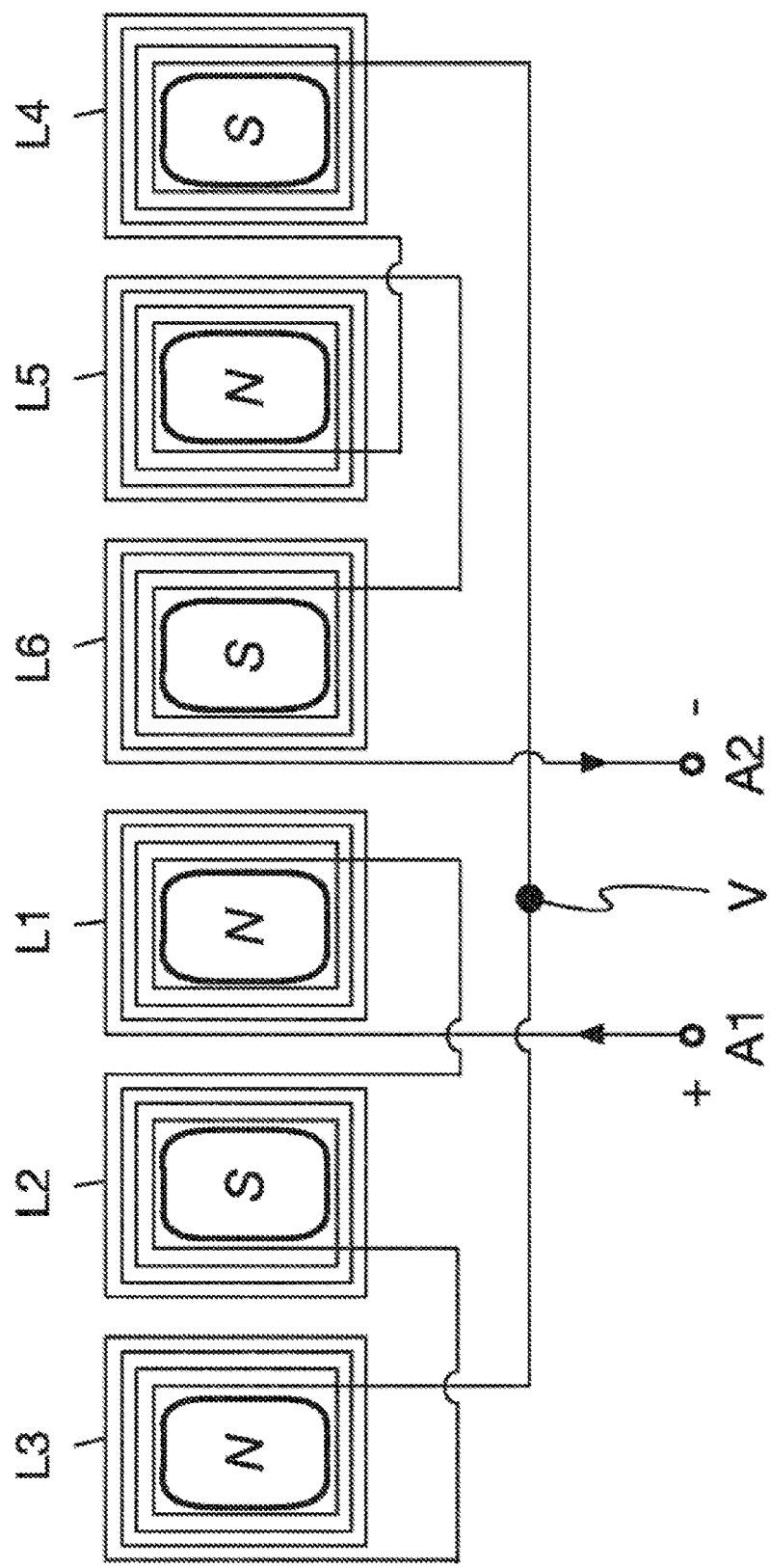
FIG. 6 schematically illustrates a detailed view of the rotor windings of the rotor from FIG. 5 and their series circuit connection.

In FIGS. 5 and 6, a second preferred embodiment of a rotor R according to the present invention is shown in the same way. The rotor R differs from the one described in FIGS. 3 and 4 in that, here, starting from the positive first connection A1 into the first n/2=6/2=3 rotor windings L1 to L3 of the first section of the series circuit, the electrical current flowing through the series circuit on the outer side of the rotor winding respectively enters into this and thereby comprises a net current flow in the radial direction from the outside in. In the case of the second n/2=3 rotor windings L4 to L6 (second section of the series circuit), in contrast, this is the other way around so that, there, the electrical current on the inner side near the core enters into the respective rotor winding and exits on the respective outer side away from the core. Once again, a symmetry with the advantages already described in connection with the first embodiment in FIGS. 3 and 4 results. Here, an additional advantage results in that the stray capacitances C1 to C6 first set in downstream from the respective corresponding rotor windings L1 to L6 with relation to the current direction and therefore a lower voltage potential is applied to them, which results in a further reduction of the capacitive coupling. In this way, favorably, if applicable, remaining stray current components that do not cancel each other out in the rotor body K and the rotor shaft W can generally be weaker than is the case with the embodiment in accordance with FIGS. 3 and 4.

Figure 7:
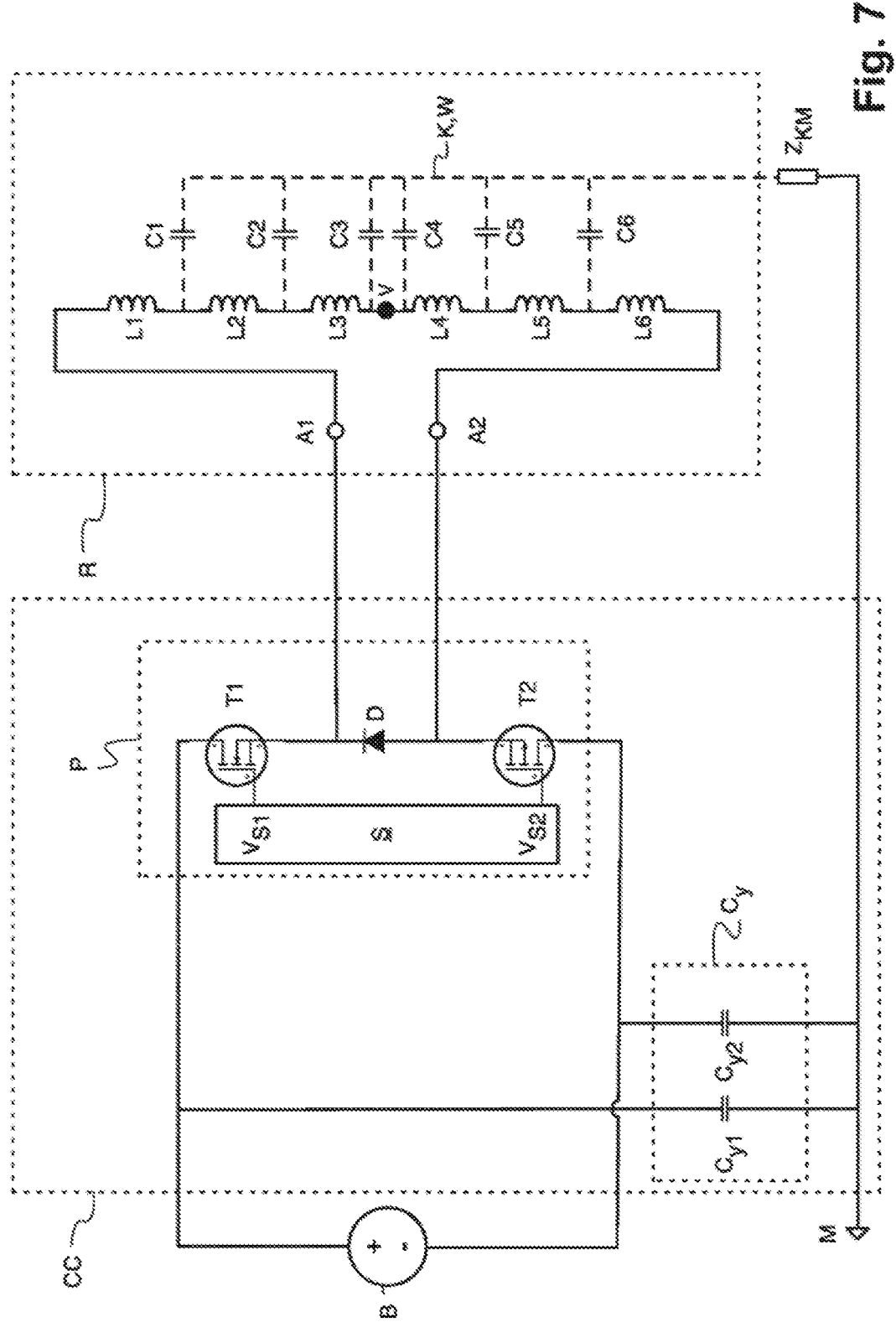
FIG. 7 illustrates a rotor circuit for controlling a rotor according to the invention, here, using the rotor from FIG. 5 and FIG. 6 as an example, in accordance with a preferred embodiment of the invention.

In FIG. 7, a rotor circuit in accordance with a preferred embodiment of the invention for controlling a rotor according to the invention, here using the rotor from FIG. 5 and FIG. 6 as an example, is shown. In addition to the rotor R itself, the rotor circuit comprises a control circuit CC provided for its control, which is electrically connected to the rotor via the two connections A1 and A2 of the rotor R for its control.

The control circuit CC contains a power setting P for supplying the rotor R with a supply D.C. voltage provided by a direct-current supply B, in particular by a battery, the level and time progression of which current can be controlled by means of the power setting P. In addition, the power setting P2 comprises over at least one freewheeling diode D connected in the blocking direction and controllable resistors T1 and T2 connected in series, which are, in particular, designed as transistors, preferably as power MOSFETs. For this purpose, via a corresponding control voltage $V_{S1}$ or $V_{S2}$, the two controllable resistors T1 and T2 can each be controlled individually by a control device S, in particular a control logic, which is preferably also part of the control circuit CC. The control device S can, in particular, be configured to impress a pulse-width-modulated alternating current signal (PWM signal) onto the current flow through the supply lines and thus the rotor windings by means of the controllable resistors T1 and/or T2, which, above all, can be used to control the power or the torque of the electric motor by varying the pulse widths and synonymously, the duty cycle. The freewheeling diode D is used to allow the instantaneous current to continue flowing when the transistors T1 and T2 switch off until the transistors switch on again (PWM) or when the voltage supply switches off, to dissipate the energy stored in the rotor, in particular in the magnetic fields of its rotor windings L1 to L6 through a corresponding current flow through the freewheeling diode D that is then operated in the forward direction.

Furthermore, the control circuit CC comprises a set $C_Y$ of Y-capacitors $C_{Y1}$ and $C_{Y2}$ connected as capacitive voltage dividers, which are connected respectively between the ground and one of the two supply lines coming from the direct voltage supply B in such a way that the ground M is coupled to the voltage supply B as a floating ground via these Y-capacitors $Cy_1$ and $Cy_2$, and a voltage potential is formed on it which lies between the potentials of the plus pole and the minus pole of the direct voltage supply B. This type of power supply network is also often referred to as an "IT network" and is regularly used in electric vehicles in particular. Ideally, the Y-capacitors $Cy_1$ and $Cy_2$ are selected in such a way, in particular by selecting the same capacitor sizes, that the potential of the ground M at least essentially lies in the middle between the potentials of the plus pole and the minus pole of the direct voltage supply B. With this rotor circuit, which can also be similarly used with other embodiments of the rotor R, in particular also with the embodiment shown in FIGS. 3 and 4, it is possible in particular to stabilize the potential of the ground M as a floating ground since the stray voltages influencing its potential, which could be coupled to it via the stray capacitances C1 to C6 and the resistor $Z_{KM}$, can be reduced or can even be avoided to a great extent. In this way, additionally, the electromagnetic compatibility (EMC) of the rotor circuit and, thereby, also of a corresponding electric motor and of a vehicle equipped with such an electric motor can be improved.

Figure 8:
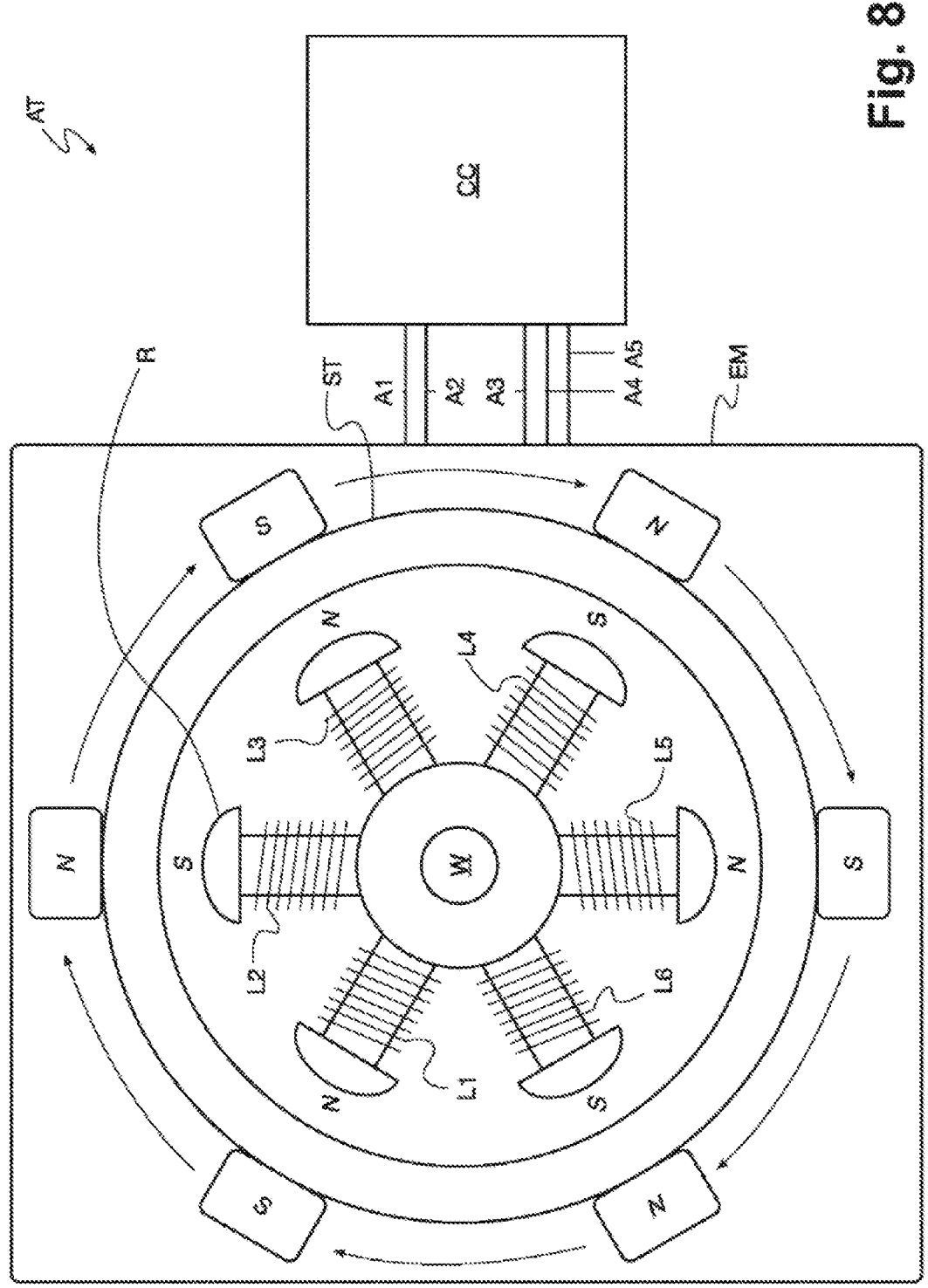
FIG. 8 schematically illustrates a drive device with a separately excited synchronous motor, including a rotor circuit in accordance with FIG. 7, in accordance with a preferred embodiment of the invention.

FIG. 8 ultimately schematically shows a drive device AT with an electric motor EM, especially a separately excited synchronous motor including a rotor circuit in accordance with FIG. 7. Here, the ground M is not drawn in for the sake of illustration clarity. In addition to the rotor R, the electric motor includes a stator ST surrounding the rotor R with corresponding field coils, which a three-phase current supply voltage is supplied to from the control circuit CC via other connections A3, A4 and A5, which three-phase current supply current is configured in such a way that the stator forms a magnetic field running around the stator in the direction of the arrow with the aid of its field coils, which the rotor R, rotatably mounted around its shaft W, follows (during normal operation, synchronously).

While, in the preceding, at least one exemplary embodiment has been described, it must be noted that a great number of variations concerning this exist. Thereby, it must also be noted that the described exemplary embodiments only represent non-limiting examples and are not intended to limit the scope, the applicability or the configuration of the devices and method described here. Rather, the preceding description should provide the person skilled in the art with instructions for the implementation of at least one exemplary embodiment, wherein it is understood that various changes in the function and arrangement of the elements described in an exemplary embodiment can be performed without deviating from the object respectively defined in the enclosed claims as well as the legitimate equivalents thereof.

REFERENCE LIST

AT drive device
EM electric motor, special separately excited synchronous motor
R rotor
ST stator
L1 . . . L6 rotor windings or field coils of the rotor
C1 . . . C6 stray capacitances of the rotor windings or field coils
n number of pole pairs of the series circuit from the rotor windings
V connection point of the two sections of the series circuit
K rotor body
W rotor shaft
A1, A2 electrical connections of the rotor, meaning its rotor windings
A3, A4, A5 electrical connections of the stator, meaning its field coil windings
N magnetic north pole
S magnetic south pole
M floating ground, for example chassis of a vehicle at the same time
B direct voltage supply, in particular a battery
$Z_{KM}$ overall resistance (impedance) between rotor body/shaft and M
CC control circuit
P power setting
S control device
T1, T2 controllable resistors, in particular transistors
$V_{S1}$, $V_{S2}$ control voltages for T1, T2
D (freewheeling) diode
Cy set of Y-capacitors, capacitive voltage divider
$Cy_1$, $Cy_2$ Y-capacitors of Cy The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotor for a separately excited synchronous motor, the rotor comprising:
a rotor body; and
an even number, n, of pole pairs arranged on the rotor body with one rotor winding, respectively, wherein the rotor windings of the pole pairs are connected in series as a series circuit between two electrical connections of the rotor used to supply or conduct away an electrical excitation current through the rotor windings;
wherein the series circuit has a first section comprising a first n/2 rotor windings, from a first of the two electrical connections, arranged first in the series circuit, and a second section comprising a second n/2 rotor windings arranged upstream of a second of the two electrical connections; and
wherein the rotor windings and the series circuit are designed in such a way that during application of a direct-current voltage between the two electrical connections in each of the rotor windings of the first section, a radial component of the direct-current flow present in the series circuit extends through an entire respective rotor winding, from an outer side to an inner side of the rotor winding, and in each of the rotor windings of the second section, in reverse, from an outer side to an inner side of the rotor winding.

2. The rotor according to claim 1, wherein, within the series circuit, the first section and the second section are connected at a connection point in such a way that two rotor windings, which are directly successively connected via the connection point are each connected to the connection point from a winding section lying on the outer side of their respective winding.

3. The rotor according to claim 2, wherein the rotor windings and the series circuit are designed to be symmetrical in such a way that a first electrical stray capacitance of the first section of the rotor body corresponds to a second electrical stray capacitance of the second section of the rotor body of the rotor.

4. The rotor according to claim 1, wherein, within the series circuit, the first section and the second section are connected at a connection point in such a way that two rotor windings, which are directly successively connected via the connection point are each connected to the connection point from a winding section lying on the inner side of their respective winding.

5. The rotor according to claim 4, wherein the rotor windings and the series circuit are designed to be symmetrical in such a way that a first electrical stray capacitance of the first section of the rotor body corresponds to a second electrical stray capacitance of the second section of the rotor body of the rotor.

6. The rotor according to claim 1, wherein the rotor windings and the series circuit are designed to be symmetrical in such a way that a first electrical stray capacitance of the first section of the rotor body corresponds to a second electrical stray capacitance of the second section of the rotor body of the rotor.

7. The rotor according to claim 6, wherein a difference between the first electrical stray capacitance of the first section and the second electrical stray capacitance of the second section of the rotor body is no more than 10% of a resulting stray capacitance of the series circuit of n rotor windings of the rotor body running between the connections of the rotor.

8. The rotor according to claim 7, wherein the difference between the first electrical stray capacitance of the first section and the second electrical stray capacitance of the second section of the rotor body is no more than 5% of the resulting stray capacitance of the series circuit of n rotor windings of the rotor body running between the connections of the rotor.

9. The rotor according to claim 7, wherein the difference between the first electrical stray capacitance of the first section and the second electrical stray capacitance of the second section of the rotor body is no more than 2% of the resulting stray capacitance of the series circuit of n rotor windings of the rotor body running between the connections of the rotor.

10. A rotor circuit for a separately excited synchronous motor, comprising:
a rotor comprising:
a rotor body; and
an even number, n, of pole pairs arranged on the rotor body with one rotor winding, respectively, wherein the rotor windings of the pole pairs are connected in series as a series circuit between two electrical connections of the rotor used to supply or conduct away an electrical excitation current through the rotor windings;
wherein the series circuit has a first section comprising a first n/2 rotor windings, from a first of the two electrical connections, arranged first in the series circuit, and a second section comprising a second n/2 rotor windings arranged upstream of a second of the two electrical connections; and
wherein the rotor windings and the series circuit are designed in such a way that during application of a direct-current voltage between the two electrical connections in each of the rotor windings of the first section, a radial component of the direct-current flow present in the series circuit extends through an entire respective rotor winding, from an outer side to an inner side of the rotor winding, and in each of the rotor windings of the second section, in reverse, from an outer side to an inner side of the rotor winding;
a first supply line for connecting a first pole of a direct-current supply to the first of the two electrical connections of the rotor and a second supply line for connecting a second opposing pole of the direct-current supply to the second of the two electrical connections of the rotor; and
a capacitive voltage divider connected at a first connection between the first supply line and the second supply line with a first Y-capacitor between the first supply line and an electrically conductive connection to the rotor body and a second Y-capacitor between the first connection and the second supply line.

11. The rotor circuit according to claim 10, wherein the first supply line comprises a first controllable resistor, the second supply line comprises a second controllable resistor, and a freewheeling diode for the rotor windings is connected between the first controllable resistor and the second controllable resistor and in parallel to the connections of the rotor windings.

12. The rotor circuit according to claim 11, furthermore comprising a controller programmed to control the controllable resistors with a PWM-modulated control signal.

13. A separately excited synchronous motor for an electrically driven vehicle, comprising:
a rotor comprising:
a rotor body; and
an even number, n, of pole pairs arranged on the rotor body with one rotor winding, respectively, wherein the rotor windings of the pole pairs are connected in series as a series circuit between two electrical connections of the rotor used to supply or conduct away an electrical excitation current through the rotor windings;
wherein the series circuit has a first section comprising a first n/2 rotor windings, from a first of the two electrical connections, arranged first in the series circuit, and a second section comprising a second n/2 rotor windings arranged upstream of a second of the two electrical connections; and
wherein the rotor windings and the series circuit are designed in such a way that during application of a direct-current voltage between the two electrical connections in each of the rotor windings of the first section, a radial component of the direct-current flow present in the series circuit extends through an entire respective rotor winding, from an outer side to an inner side of the rotor winding, and in each of the rotor windings of the second section, in reverse, from an outer side to an inner side of the rotor winding; and
a stator assigned to the rotor for generating an electromotive effect interacting between the stator and the rotor.

14. The separately excited synchronous motor according to claim 13, further comprising:
a first supply line for connecting a first pole of a direct-current supply to the first of the two electrical connections of the rotor and a second supply line for connecting a second opposing pole of the direct-current supply to the second of the two electrical connections of the rotor; and
a capacitive voltage divider connected at a first connection between the first supply line and the second supply line with a first Y-capacitor between the first supply line and an electrically conductive connection to the rotor body and a second Y-capacitor between the first connection and the second supply line.

15. The separately excited synchronous motor according to claim 13, wherein, within the series circuit, the first section and the second section are connected at a connection point in such a way that two rotor windings, which are directly successively connected via the connection point are each connected to the connection point from a winding section lying on the outer side of their respective winding.

16. The separately excited synchronous motor according to claim 13, wherein, within the series circuit, the first section and the second section are connected at a connection point in such a way that two rotor windings, which are directly successively connected via the connection point are each connected to the connection point from a winding section lying on the inner side of their respective winding.

17. The separately excited synchronous motor according to claim 13, wherein the rotor windings and the series circuit are designed to be symmetrical in such a way that a first electrical stray capacitance of the first section of the rotor body corresponds to a second electrical stray capacitance of the second section of the rotor body of the rotor.

18. The separately excited synchronous motor according to claim 17, wherein a difference between the first electrical stray capacitance of the first section and the second electrical stray capacitance of the second section of the rotor body is no more than 10% of a resulting stray capacitance of the series circuit of n rotor windings of the rotor body running between the connections of the rotor.

19. The separately excited synchronous motor according to claim 18, wherein the difference between the first electrical stray capacitance of the first section and the second electrical stray capacitance of the second section of the rotor body is no more than 5% of the resulting stray capacitance of the series circuit of n rotor windings of the rotor body running between the connections of the rotor.

20. The separately excited synchronous motor according to claim 18, wherein the difference between the first electrical stray capacitance of the first section and the second electrical stray capacitance of the second section of the rotor body is no more than 2% of the resulting stray capacitance of the series circuit of n rotor windings of the rotor body running between the connections of the rotor.

* * * * *